US012720224B2

(12) United States Patent
Chossat

(10) Patent No.: US 12,720,224 B2
(45) Date of Patent: Aug. 25, 2026

(54) COMPRESSION OF COORDINATE LOCATIONS OF DEFECTIVE PIXELS ON AN IMAGING SENSOR

(71) Applicant: STMicroelectronics International N.V., Geneva (CH)

(72) Inventor: Jerome Chossat, Voiron (FR)

( * ) Notice: Subject to any disclaimer, the term of this patent is extended or adjusted under 35 U.S.C. 154(b) by 39 days.

(21) Appl. No.: 19/033,588

(22) Filed: Jan. 22, 2025

(65) Prior Publication Data

US 2026/0214350 A1 Jul. 23, 2026

(51) Int. Cl.
*H04N 25/60* (2023.01)

(52) U.S. Cl.
CPC .................................. *H04N 25/60* (2023.01)

(58) Field of Classification Search
CPC ........ H04N 25/60; H04N 25/68; H04N 19/59; H04N 19/46; H04N 19/65; H04N 19/182; H04N 19/44; H04N 17/002; G06T 5/77
USPC .................................................... 348/231.99
See application file for complete search history.

(56) References Cited

U.S. PATENT DOCUMENTS 5,436,659 A * 7/1995 Vincent .................. H04N 25/68 348/241
7,061,533 B1 * 6/2006 Urushiya ............... G01N 23/04 348/346
8,026,964 B2 * 9/2011 Walter .................. H04N 25/68 348/246
8,963,910 B2 * 2/2015 Ogawa ................. H04N 25/134 348/241
10,440,299 B2 * 10/2019 Lin ...................... H04N 25/683
10,621,706 B2 * 4/2020 Lee ........................ H04N 25/68
10,868,985 B2 * 12/2020 Lin ...................... H04N 25/683
10,951,843 B2 * 3/2021 Lin ....................... G06T 7/0004
11,823,417 B2 * 11/2023 Lee ........................ H04N 19/46
12,041,365 B2 * 7/2024 Cote .................... H04N 23/631
12,519,926 B2 * 1/2026 Pyeoun ................ H04N 17/002
2013/0265295 A1 * 10/2013 Ogawa .................. H04N 25/68 345/214
2019/0087945 A1 3/2019 Lee
2020/0084401 A1 3/2020 Lin et al.
2020/0145594 A1 5/2020 Lin et al.
2023/0345146 A1 10/2023 Cote et al.

FOREIGN PATENT DOCUMENTS

CN 116912248 A 10/2023

* cited by examiner

*Primary Examiner* — Pritham D Prabhakher
(74) *Attorney, Agent, or Firm* — Alston & Bird LLP

(57) ABSTRACT

An example apparatus, a computer-implemented method for encoding a coordinate locations, and an imaging sensor comprising location encoding circuitry are provided. The example apparatus includes location encoding circuitry configured to receive a coordinate location associated with a location in a coordinate system; determine a sequential distance between the coordinate location and a previous coordinate location, wherein the sequential distance indicates a number of positions in a sequential order between the coordinate location and the previous coordinate location; determine a step size based on a plurality of coordinate locations; and determine a coordinate location encoding associated with the coordinate location based on a comparison of the sequential distance to the step size.

17 Claims, 9 Drawing Sheets

COMPRESSION OF COORDINATE LOCATIONS OF DEFECTIVE PIXELS ON AN IMAGING SENSOR

TECHNOLOGICAL FIELD

Embodiments of the present disclosure relate generally to storing coordinate locations associated with a location in a coordinate system, and more particularly, to encoding the coordinate locations in a compressed format.

BACKGROUND

Image sensors utilize an array of pixels, often in a two-dimensional array, wherein each pixel is positioned to capture light information from a specific part of a scene. Each pixel comprises a photodiode device to absorb energy from light and generate an electrical output based on the absorbed light. The electrical output from each pixel in the array of pixels is combined to form an image of the scene. However, some pixels in the array of pixels may be defective. For example, electrical components within the pixel circuitry may experience leakage current, or other electrical anomalies that result in an electrical output that is not representative of the light received at the pixel.

Applicant has identified many technical challenges and difficulties associated with storing the coordinate locations of defective pixels. Through applied effort, ingenuity, and innovation, Applicant has solved problems related to the storage of coordinate locations by developing solutions embodied in the present disclosure, which are described in detail below.

BRIEF SUMMARY

Various embodiments are directed to an example apparatus, a computer-implemented method for encoding a coordinate locations, and an imaging sensor comprising location encoding circuitry. An example apparatus is provided. The example apparatus comprising location encoding circuitry configured to receive a coordinate location associated with a location in a coordinate system; determine a sequential distance between the coordinate location and a previous coordinate location, wherein the sequential distance indicates a number of positions in a sequential order between the coordinate location and the previous coordinate location; determine a step size based on a plurality of coordinate locations; and determine a coordinate location encoding associated with the coordinate location based on a comparison of the sequential distance to the step size.

In some embodiments, the apparatus may further comprising location decoding circuitry configured to: receive the coordinate location encoding; determine the sequential distance between the coordinate location and the previous coordinate location based on the coordinate location encoding; and determine the coordinate location in the coordinate system based on the sequential distance and the previous coordinate location.

In some embodiments, the coordinate system is associated with an imaging sensor.

In some embodiments, each coordinate location in the coordinate system corresponds to a pixel on the imaging sensor.

In some embodiments, the coordinate location corresponds to a defective pixel.

In some embodiments, the coordinate system corresponds to a two-dimensional array of pixels.

In some embodiments, the sequential order is a row-major order.

In some embodiments, the apparatus is located on the imaging sensor.

In some embodiments, the location encoding circuitry is further configured to: receive the plurality of coordinate locations; and determine the step size based on a statistical representation of an average number of positions between the plurality of coordinate locations.

In some embodiments, the location encoding circuitry is further configured to: write the coordinate location encoding to a one-time programmable non-volatile memory device.

In some embodiments, the coordinate location encoding indicates the sequential distance is greater than the step size.

In some embodiments, the coordinate location is associated with a memory location in a contiguous memory block.

In some embodiments, each memory location in the contiguous memory block corresponds to the location of the coordinate location in the coordinate system.

In some embodiments, consecutive memory locations in the contiguous memory block correspond with the sequential order.

A computer-implemented method for encoding a coordinate location is also provided. In some embodiments, the computer-implemented method comprises: receiving, at location encoding circuitry, the coordinate location, wherein the coordinate location is associated with a location in a coordinate system; determining a sequential distance between the coordinate location and a previous coordinate location, wherein the sequential distance indicates a number of positions in a sequential order between the coordinate location and the previous coordinate location; determining a step size based on a plurality of coordinate locations; and determining a coordinate location encoding associated with the coordinate location based on a comparison of the sequential distance to the step size.

In some embodiments, the computer-implemented method further comprises: receiving, at location decoding circuitry, the coordinate location encoding; determining the sequential distance between the coordinate location and the previous coordinate location based on the coordinate location encoding; and determining the coordinate location in the coordinate system based on the sequential distance and the previous coordinate location.

In some embodiments, the coordinate system is associated with an imaging sensor, and each memory location in the coordinate system corresponds to a defective pixel on the imaging sensor.

In some embodiments, the computer-implemented method further comprises writing the coordinate location encoding to a one-time programmable memory device.

In some embodiments, the coordinate location encoding indicates the sequential distance is greater than the step size.

An example imaging sensor is further provided. In some embodiments, the example imaging sensor comprises a two-dimensional array of pixels; a one-time programmable memory device; and an apparatus. The apparatus comprising location encoding circuitry configured to: receive a coordinate location associated with a location of a pixel in a coordinate system corresponding to the two-dimensional array of pixels; determine a sequential distance between the coordinate location and a previous coordinate location, wherein the sequential distance indicates a number of positions in a sequential order between the coordinate location and the previous coordinate location; determine a step size based on a plurality of coordinate locations; determine a coordinate location encoding associated with the coordinate location based on a comparison of the sequential distance to the step size; and write the coordinate location encoding to the one-time programmable memory device.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
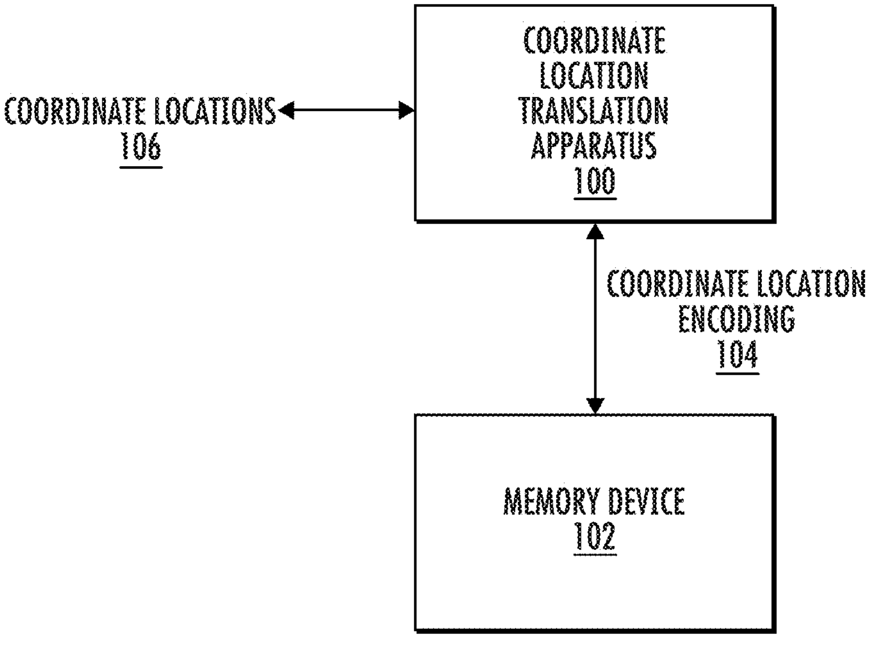
FIG. 1 illustrates a block diagram of a system comprising an example coordinate location translation apparatus in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with storing coordinate locations in a memory device. As understood by those of skill in the field to which the present disclosure pertains, there are numerous example scenarios in which it may be beneficial to reduce the amount of storage required to store coordinate locations in a memory device.

For example, image sensors are widely used in various applications that require the capture and processing of visual information. Image sensors may be used for image capture on digital electronics, such as digital cameras, smart phones, webcams, and the like. Image sensors also play a crucial role in object detection and navigation, especially in advanced technologies like autonomous vehicles, drones, and robotics. The accurate capture of visual data and detection of objects in an environment is essential to the safe operation of many of these advanced technologies.

In general, image sensors utilize an array of pixels, often in a two-dimensional array, wherein each pixel is positioned to capture light information from a specific part of a scene. Each pixel comprises a photodiode device to absorb energy from light and generate an electrical output based on the absorbed light. The electrical output may be integrated and stored at a memory location corresponding to the coordinate location of the pixel. The electrical output from each pixel in the array of pixels is combined to form an image of the scene. However, some pixels in the array of pixels may be defective. For example, electrical components within the pixel circuitry may experience leakage current, or other electrical anomalies that result in an electrical output that is not representative of the light received at the pixel.

Image sensors may go through a calibration process to identify defective pixels. For example, an image sensor may be connected to a testing mechanism configured to identify defective pixels. A testing mechanism may monitor the electrical output of each pixel in various conditions, such as in dark conditions and in light conditions, and identify defective pixels based on the electrical output. The locations of the defective pixels may be stored in a one-time programmable memory of the image sensor, such that a host processing system interfacing with the image sensor may compensate for the defective pixels based on the application.

Recently, host processing systems, have preferred to receive raw image data and identification of each defective pixel to perform compensation techniques specific to the desired application. In some embodiments, complying with such a preference involves lowering the threshold of a defective pixel, thereby increasing the number of defective pixels in storage. Increasing the number of pixels in one-time programmable memory may be problematic due to the limited size of the one-time programmable memory.

In general, defective pixel locations may be stored in one-time programmable memory based on the coordinate location of the defective pixel within the array of pixels, for example, by x and y location in a two-dimensional pixel array. A memory location identified by x, y location may occupy significant memory space. For example, an x-location may require sufficient data bits to represent the full width of the pixel array, and a y-location may require enough data bits to represent the full height of the pixel array. Thus, in an instance in which an image comprises a pixel array width of 2560, and a pixel array height of 1920, 12 bits are required to represent the x-location, while 11 bits are required to represent the y-location. Thus, every stored coordinate location requires 23 bits. The amount of memory required to store 23 bits for each coordinate location may become problematic, particularly in an instance in which thousands of memory locations are stored and the memory availability of the one-time programmable memory is limited.

The various example embodiments described herein utilize various techniques to compress the amount of memory required to store coordinate locations. For example, in some embodiments, coordinate locations may be stored relative to a previous location in a list of coordinate locations, or, relative to an origin of the coordinate system for the first coordinate in the list of coordinate locations. In this way, the coordinate location encoding representing each coordinate location may represent a sequential distance from the previous coordinate location in the list of coordinate locations (or the origin). In order to reduce the data bits required to store the sequential distance and effectively represent all possible coordinate locations, the sequential distance may be indicated relative to a step size. In some embodiments, the step size may be related to the average distance between coordinate locations.

When a step size is utilized, the coordinate location encoding may include a jump indicator portion (e.g., a bit) indicating whether the sequential distance between two successive coordinate locations is greater than the step size. In an instance in which the sequential distance is less than or equal to the step size, the remaining portion of the coordinate location encoding indicates the sequential distance to the next coordinate location.

However, in an instance in which the sequential distance is greater than the step size, the coordinate location encoding may include a jump number portion. A jump represents a number of steps in a coordinate location sequence equal to the step size plus one. For example, in an instance in which the step size is 1023, one jump represents a sequential distance of 1024. In an instance in which the jump number portion is non-zero, the jump number portion of the coordinate location encoding indicates the number of jumps in the sequential distance. The remaining distance indicator portion of the coordinate location encoding represents the remaining distance in the sequential distance in addition to the jumps performed.

The jump number portion of the coordinate location encoding may be limited by the number of data bits comprising the jump number portion. For example, in an instance in which the jump number portion comprises five data bits, the number of jumps that may be represented by the jump number portion is limited to a maximum of thirty-one. In an instance in which the sequential distance is greater than the distance represented by the max number of jumps, the coordinate location encoding may include a max jumps indicator, indicating the max number of jumps should be taken. In one specific example, the max jumps indictor may comprise setting the jump number portion to all zeros. The max jumps indicator may be repeated as necessary, indicating repeated application of the max jumps to obtain the sequential distance to the next coordinate location. As necessary, a jump number portion and a remaining distance indicator portion may be included in the coordinate location encoding to indicate the full sequential distance.

By utilizing a coordinate location encoding based on the sequential distance between consecutive coordinate locations in a coordinate location list, and by representing the sequential distance relative to a step size, the number of data bits required to represent a coordinate location may be greatly reduced for most coordinate locations to be encoded, for example, if the number of bits used to represent the step size are chosen in accordance with a defect probability distribution. In addition, the space allocated to memory for storge of the list of coordinate locations may be reduced, enabling reduction in size of the host processing device and/or storage of more coordinate locations.

Referring now to FIG. 1, an example coordinate location translation apparatus 100 configured to encode and decode coordinate locations 106 in accordance with one or more embodiments of the present disclosure, is provided. As depicted in FIG. 1, the coordinate location translation apparatus 100 is configured to receive coordinate location 106, generate coordinate location encodings 104, and write the coordinate location encodings 104 to a memory device 102. As further depicted in FIG. 1, the coordinate location translation apparatus 100 is configured to receive coordinate location encodings 104 from the memory device 102 and generate coordinate locations 106 based on the coordinate location encoding 104.

As depicted in FIG. 1, the coordinate location translation apparatus 100 is configured to receive coordinate locations 106. Coordinate locations 106 comprise any data, value, string, or other data construct representing a location within a coordinate system. Although discussed primarily in relation to a two-dimensional coordinate system, the principles described herein may be applied to any coordinate system in which the coordinates may be translated to a sequential order. In some embodiments, a coordinate location 106 may correspond to a position in a two-dimensional array. For example, a coordinate location 106 may comprise an x, y pair, wherein the x-location identifies the column in the two-dimensional coordinate system, and the y-location identifies the row in the two-dimensional coordinate system.

In some embodiments, the coordinate location 106 may identify a particular structure or object in the associated coordinate system. For example, a coordinate location 106 may identify a particular pixel location in an instance in which the coordinate system corresponds to a two-dimensional array of pixels. In such an embodiment, each coordinate location 106 may identify a defective pixel in the array of pixels. A defective pixel comprises any pixel in the pixel array inaccurately generates an electrical output (or generates no electrical output) inconsistent with the photons received at the pixel location. Defections in pixels may occur due to undesired leakage current, aging, or another factor. Defective pixel locations may be identified during a calibration process and written to a memory device on the corresponding image sensor. A defective pixel may be identified based on a threshold value. For example, a pixel exhibiting an error or anomaly exceeding a threshold may be identified as a defective pixel. In some applications, the threshold may be lowered, resulting in significantly more defective pixels. Still, in some applications, the host processing device may need or desire to access all defective pixels, enabling the host processing device to control any compensation techniques related to the defective pixels.

The coordinate locations 106 may further be associated with a memory location. For example, in some embodiments, each coordinate location may be associated with a value stored in the associated memory location. In some embodiments, the memory locations corresponding to the coordinate locations 106 may be contained in a contiguous memory block. A contiguous memory block is any uninterrupted section of memory where data may be stored in a sequential order. In some embodiments, this may mean all the data associated with a process or structure occupies a continuous block of adjacent memory addresses. For example, an image sensor may be allocated a contiguous memory block wherein each pixel in the pixel array is allocated an adjacent memory address based on the scan order. Each time an electrical output is generated by a pixel, the integrated value associated with the electrical output may be stored at the corresponding memory location in the contiguous memory block. In some embodiments, the sequence in memory may be defined by a scan order of the array of pixels.

The coordinates in a coordinate system may further be associated with a sequential order. A sequential order may define an order or sequence with respect to each coordinate location. For example, in a two-dimensional coordinate system, a sequential order may be a row-major order. A row-major order defines a sequence of coordinate locations in which the coordinate locations of each row are placed consecutively. In a row-major order, each coordinate is ordered in sequence across a first row, and then each coordinate in sequence across the next row down and so on. Another example sequential order may be a column-major order. A column-major order defines a sequence of coordinate locations in which the coordinate locations of each column are placed consecutively. In a column-major order, each coordinate is ordered in sequence down a first column, and then each coordinate in sequence down the next column across and so on.

A sequential distance may be defined based on the sequential order of the coordinate system. For example, a sequential distance may represent a number of possible positions between two coordinate locations 106 in a sequential order of all the coordinate locations 106 in the coordinate system. For example, in a row-major order, the last coordinate location 106 in the first row and the first coordinate location 106 on the second row may be separated by a sequential distance of one. In some embodiments, the sequential order may correspond to the memory locations of the values associated with the coordinate locations 106 in memory. Thus, a sequential distance between two coordinate locations 106 may correspond to the difference in the memory locations corresponding to the two coordinate locations 106.

In some embodiments, the coordinate locations 106 may be included in a list of coordinate locations 106. The coordinate locations 106 in the list of coordinate locations 106 may be listed in a sequential order. For example, the order in which the coordinate locations 106 are encountered in a scan order.

As further depicted in FIG. 1, the coordinate location translation apparatus 100 may be configured to read and write coordinate location encodings to a memory device 102. A memory device 102 comprises any circuitry including hardware and/or software configured to store information for immediate and/or later use. A memory device 102 may comprise volatile and/or non-volatile memory. In some embodiments, the memory device 102 may comprise non-volatile, one-time programmable memory. One-time programmable memory is a read-only memory comprising memory storage locations that may only be programmed once. In some embodiments, the memory device 102 may be packaged with a host processing device, and the memory locations of the memory device 102 may be written in coordination with an initialization process.

In general, the coordinate location translation apparatus 100 reads and/or receives coordinate location encodings 104 form the memory device 102 and generates coordinate locations 106. Additionally, or alternatively, the coordinate location translation apparatus 100 receives and/or reads coordinate locations 106 and generates a coordinate location encoding 104 corresponding to each coordinate location 106.

A coordinate location encoding 104 represents a coordinate location 106 in a coordinate system by determining a sequential distance relative to an adjacent coordinate location in a sequentially ordered coordinate location 106 list. The sequential distance between two adjacent coordinate locations 106 corresponds to the number of possible positions between the two coordinate locations 106 in a coordinate system in accordance with the pre-determined sequential order.

To reduce the number of data bits required to represent each coordinate location relative to an adjacent coordinate location in the coordinate location 106 list, the coordinate location translation apparatus 100 determines a step size and compares the sequential distance to the step size. A step size (e.g., max step size) comprises the max change in sequential positions in a sequential order that may be represented by the coordinate location encoding 104. The step size may be determined based on the size of the available memory, and/or characteristics of the coordinate locations 106 and corresponding structures (e.g., pixels) affiliated with the coordinate locations 106. For example, in some embodiments, one or more statistics may be derived relative to the coordinate locations and/or host processing system.

In one non-limiting example, the step size may be based on the average distance between identified coordinate locations, for example, defective pixels. In such an embodiment, all the defective pixels may be identified and counted. The step size may then be determined based on the ratio of defective pixels to total pixels. For example, an imaging sensor may comprise a two-dimensional array of 2560 pixels by 1920 pixels or a total of 4,915,200 pixels. In an example in which 2000 defective pixels are detected, the average distance between defective pixels is thus 4,915,200/2000=2457.6. The step size may be selected based on a power of two at or near the average distance between defective pixels, for example, 2047. In such an instance, the step size may fully utilize the bits available to represent the change in sequential positions between to coordinate locations 106, wherein eleven bits (211=2048) may be used in the distance indicator portion of the coordinate location encoding to represent the change in sequential positions.

In some embodiments, the step size may be based on pixel locations on the particular associated imaging sensor. In some embodiments, the step size may be based on a plurality of imaging sensors. For example, a representative average distance between defective pixels may be determined based on one or more similar imaging sensors.

Figure 2:
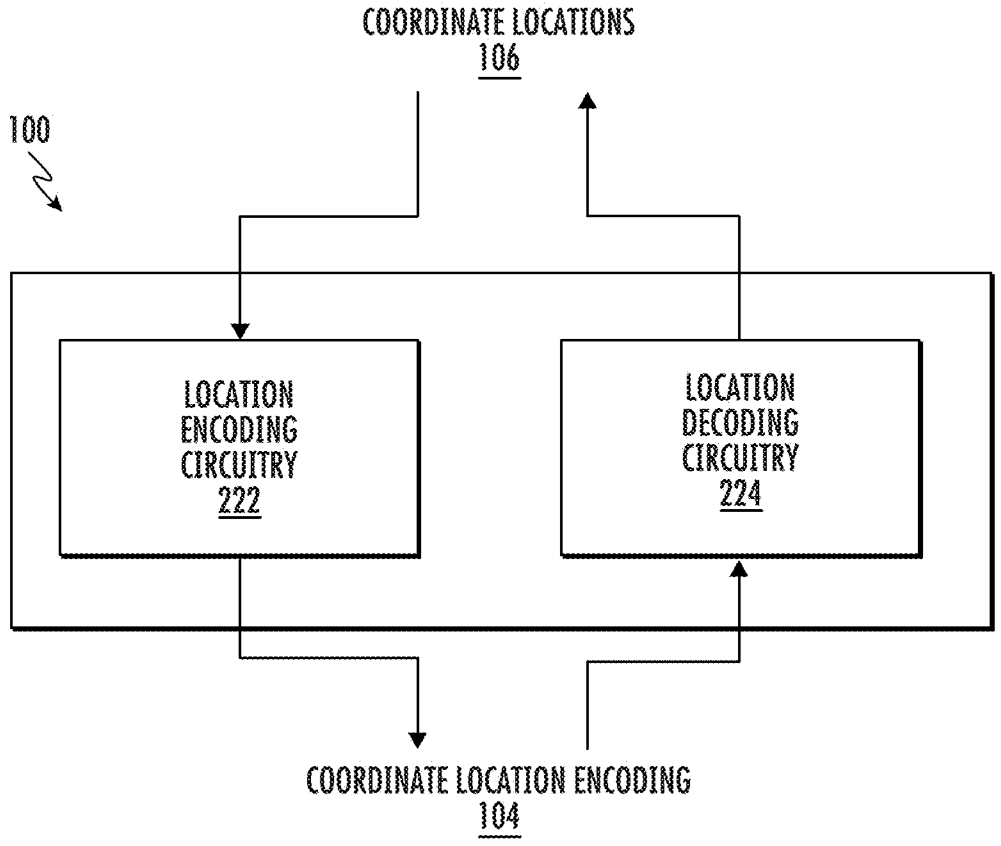
FIG. 2 illustrates an example block diagram of an example coordinate location translation apparatus in accordance with an example embodiment of the present disclosure.

Referring now to FIG. 2, a block diagram of an example coordinate location translation apparatus 100 is depicted. As depicted in FIG. 2, the coordinate location translation apparatus 100 includes location encoding circuitry 222. The location encoding circuitry 222 is configured to receive coordinate locations 106 and generate a coordinate location encoding 104 base don the coordinate locations 106. As further depicted in FIG. 2, the coordinate location translation apparatus 100 further comprises location decoding circuitry 224 configured to receive the coordinate location encoding 104 and determine a candidate location 106 based on the coordinate location encoding 104.

As depicted in FIG. 2, the coordinate location translation apparatus 100 comprises location encoding circuitry 222. Location encoding circuitry 222 comprises any circuitry including hardware and/or software configured to receive one or more coordinate locations 106 and generate a coordinate location encoding 104 for each coordinate location 106. In an instance in which the one or more coordinate locations 106 are not in a sequential order, the location encoding circuitry 222 determines a sequential ordering for the one or more coordinate locations 106. The sequential ordering is based on a pre-determined sequential ordering mechanism, for example, row-major order in a two-dimensional coordinate system. The sequential order may correspond to a scan order of host processing device, and or the order of data corresponding to the coordinate locations 106 in a contiguous memory block. In some embodiments, the coordinate locations 106 may be received individually in a sequential order.

For each coordinate location 106 in the one or more coordinate locations 106, the location encoding circuitry 222 determines the sequential distance from the previous coordinate location 106 in the one or more coordinate locations 106. In an instance in which the coordinate location 106 is the first coordinate location 106 in the list of one or more coordinate locations 106, the sequential distance is determined from the first coordinate location (e.g., origin) in the coordinate system.

Once the sequential distance from the previous coordinate location 106 is determined, the sequential distance is compared to the step size. Comparing to the step size indicates whether the sequential distance may be represented by the distance indicator portion of the coordinate location encoding 104. A jump indicator portion (described in relation to FIG. 3) may indicate whether the sequential distance is less than or equal to the step size.

An example embodiment for encoding a coordinate location 106 in accordance with the present disclosure is further described in relation to FIG. 3-FIG. 6.

As further depicted in FIG. 2, the example coordinate location translation apparatus 100 includes location decoding circuitry 224. Location decoding circuitry 224 comprises any circuitry including hardware and/or software configured to receive one or more coordinate location encodings 104 and generate a coordinate location 106 corresponding to the coordinate location encoding 104.

For each coordinate location 106 represented by a coordinate location encoding 104, the location decoding circuitry 224 determines the sequential distance from the previous coordinate location 106 in the coordinate location encodings 104. The location decoding circuitry 224 may comprise various electrical components, such as accumulators, adders, and shifters controlled by finite state machines and/or counters to determine the sequential distance based on the coordinate location encodings.

Once the sequential distance from the previous coordinate location 106 is determined, the sequential distance is added to the previous coordinate location 106 to determine the coordinate location 106 associated with the coordinate location encoding 104. In an instance in which the coordinate location encoding 104 is the first coordinate location encoding 104, the sequential distance is determined from the first coordinate location (e.g., origin) in the coordinate system.

An example embodiment for encoding a coordinate location 106 in accordance with the present disclosure is further described in relation to FIG. 3-FIG. 6.

Figure 3:
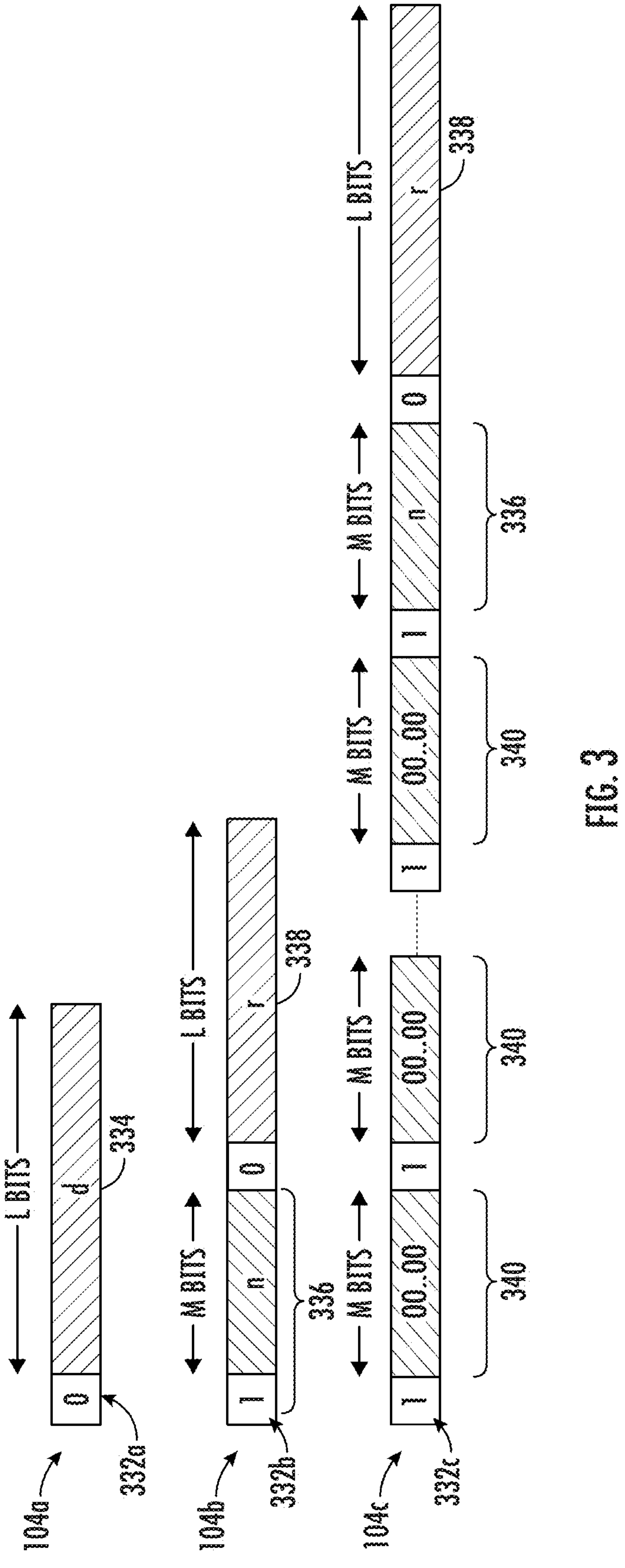
FIG. 3 illustrates example coordinate location encodings in accordance with an example embodiment of the present disclosure.

Referring now to FIG. 3, an example embodiment of a coordinate location encoding 104*a*-104*c* in accordance with an example embodiment of the present disclosure is provided. FIG. 3 depicts three different coordinate location encodings 104*a*-104*c* that may be derived based on a comparison of a sequential distance between two subsequent coordinate locations and a step size.

The first coordinate location encoding 104*a* may be used in an instance in which the sequential distance is less than or equal to the step size. As depicted in FIG. 3, the first coordinate location encoding 104*a* comprises a jump indicator portion 332*a* and a distance indicator portion 334. The jump indicator portion 332*a* indicates whether the sequential distance is greater than the step size. For example, as depicted in FIG. 3, the jump indicator portion comprises one bit. In the example of FIG. 3, a zero in the jump indicator portion 332*a* indicates the sequential distance is less than or equal to the step size and the succeeding L bits comprising the distance indicator portion 334 directly indicate the sequential distance. The distance indicator portion 334 comprises sufficient bits to indicate any distance up to an including the step size. For example, if the step size is 1023, the distance indicator portion 334 may comprise at least 10 bits. An example of the first coordinate location encoding 104*a* is further described in relation to FIG. 4.

The second coordinate location encoding 104*b* may be utilized in an instance in which the sequential distance is greater than the step size and the number of jumps is less than a max jump value. The second coordinate location encoding 104*b* is defined by a jump indicator portion 332*b* indicating a jump (e.g., set to one) and a non-zero value in the jump number portion.

A jump is a sequential increment from a start point (e.g., previous cording location) equal to the step size plus one. For example, in an instance in which the step size is 1023, one jump adds 1024 to an accumulated sequential distance, two jumps adds another 1024 (e.g., 2048 in total) to the start point, a third jump adds another 1024 (e.g., 3072 in total) to the accumulated sequential distance, and so on. The max jump number portion 336 may be associated with a max jump value. The max jump value may comprise the max number of jumps that may be indicated by the jump number portion 336. The number of jumps indicated may be limited by the number of bits comprising the jump number portion 336. For example, a jump number portion 336 comprising five bits may indicate a jump number up to 32.

The second coordinate location encoding 104*b* further comprises a remaining distance indicator portion 338. The remaining distance indicator portion 338 indicates the number of steps remaining in the sequential distance once the specified number of jumps are complete. Thus, a sequential distance may be determined by the equation:

$$n * \text{step}_{size} + r$$

where n is the number of jumps indicated in the jump number portion 336, $\text{step}_{size}$ is the step size, and r is the remaining distance indicated in the remaining distance indicator portion 338. An example of the second coordinate location encoding 104*b* is further described in relation to FIG. 5.

The third coordinate location encoding 104*c* is utilized in an instance in which the number of jumps required to encode the sequential distance is greater than the max jump value. The third coordinate location encoding 104*c* is defined by a jump indicator portion 332*b* indicating a jump (e.g., set to one) and a predefined pattern (e.g., max jumps indicator 340) in the jump number portion 336. For example, the predefined pattern as depicted in FIG. 3 is all zeros.

A max jumps indicator—as indicated by the jump indicator portion 332*c* being set and the jump number portion 336 equaling the predefined pattern-indicates the max jump value multiplied by the max step value, should be added to the sequential distance. For example, in an instance in which the max step value is 1024, and the max jump value is 32, the sequential distance should be incremented by 32,768 (32*1024) every time the jump indicator portion 332*c* is set and the jump number portion 336 equals the predefined pattern. The max jumps indicator may be repeated as necessary in the coordinate location encoding 104*c*, until the remaining distance in the sequential distance is less than or equal to the step size. An example of the third coordinate location encoding 104*c* is further described in relation to FIG. 6.

Figure 4:
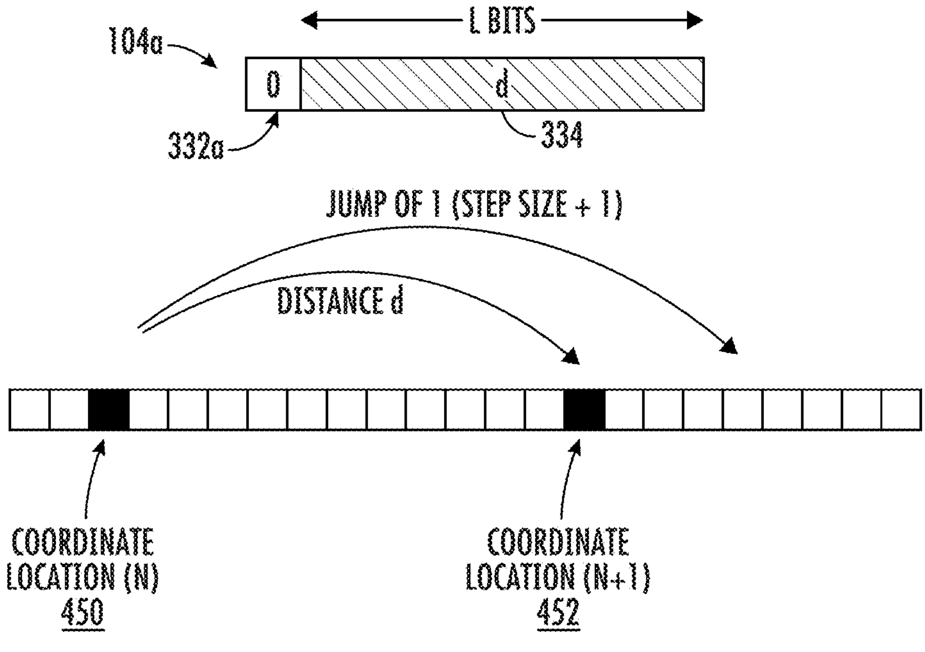
FIG. 4 illustrates a coordinate location encoding indicating a sequential distance less than or equal to a step size in accordance with an example embodiment of the present disclosure.

Referring now to FIG. 4, an example first coordinate location encoding 104*a* is depicted. As depicted in FIG. 4, the coordinate location encoding 104*a* includes a jump indicator portion 332*a* and a distance indicator portion 334. The coordinate location encoding 104*a* of FIG. 4 encodes the sequential distance of the next coordinate location (N+1) 452 relative to the coordinate location (N) 450. As shown in the example first coordinate location encoding 104*a*, the jump indicator portion 332*a* is set to zero, indicating the sequential distance (d) to the next coordinate location 452 from the coordinate location 450 is less than or equal to the step size. Since the jump indicator portion 332*a* indicates no jump is necessary, the jump indicator portion 332*a* of the coordinate location encoding 104*a* is followed by a distance indicator portion 334. The distance indicator portion 334 indicates the sequential distance from the coordinate location 450 to the next coordinate location 452.

Figure 5:
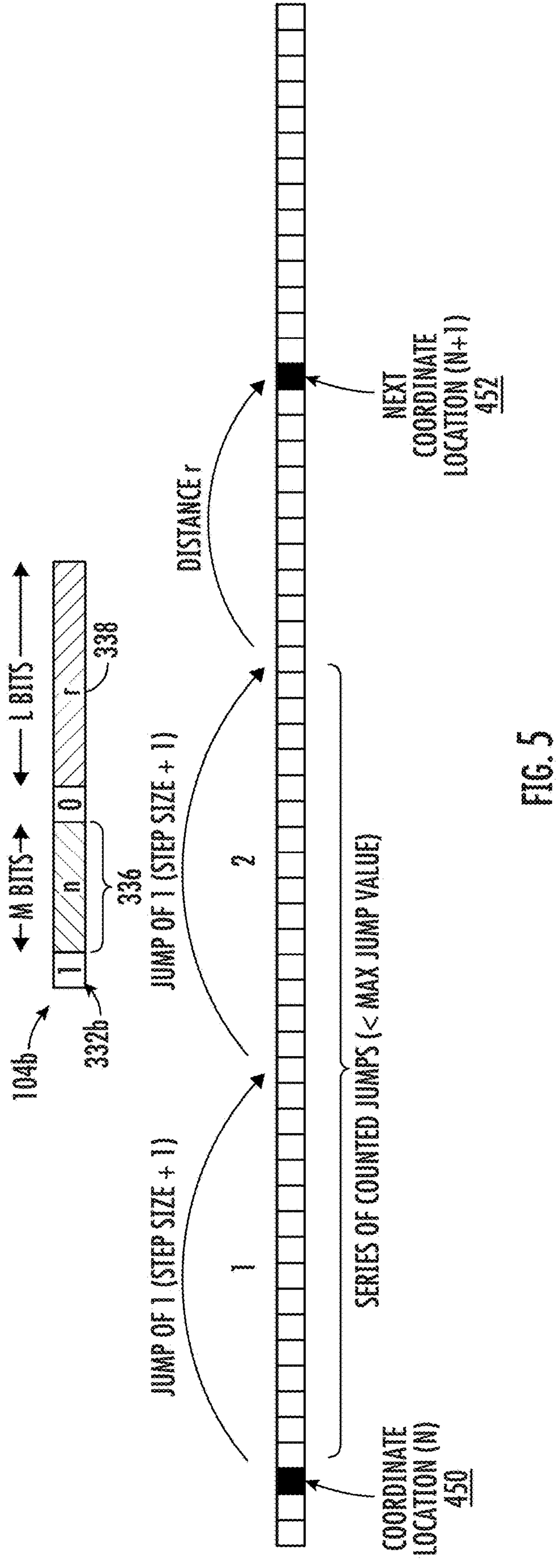
FIG. 5 illustrates an example coordinate location encoding indicating a number of jumps less than a max jump value in accordance with an example embodiment of the present disclosure.

Referring now to FIG. 5, an example second coordinate location encoding 104*b* is depicted. As depicted in FIG. 5, the example coordinate location encoding 104*b* includes a jump indicator portion 332*b*, a non-zero jump number portion 336, and a remaining distance indicator portion 338. The coordinate location encoding 104*b* of FIG. 5 encodes the sequential distance of the next coordinate location (N+1) 452 relative to the coordinate location (N) 450.

As shown in the example second coordinate location encoding 104*b* of FIG. 5, the jump indicator portion 332*b* is set to one (indicating a jump is required) and the jump number portion 336 is non-zero, indicating the sequential distance may be determined by the number of jumps indicated in the jump number portion 336 and the remaining distance indicator portion 338. The sequential distance is thus calculated by multiplying the number of jumps indicated in the jump number portion 336 by the step size, and adding the remaining distance indicated in the remaining distance indicator portion 338.

Figure 6:
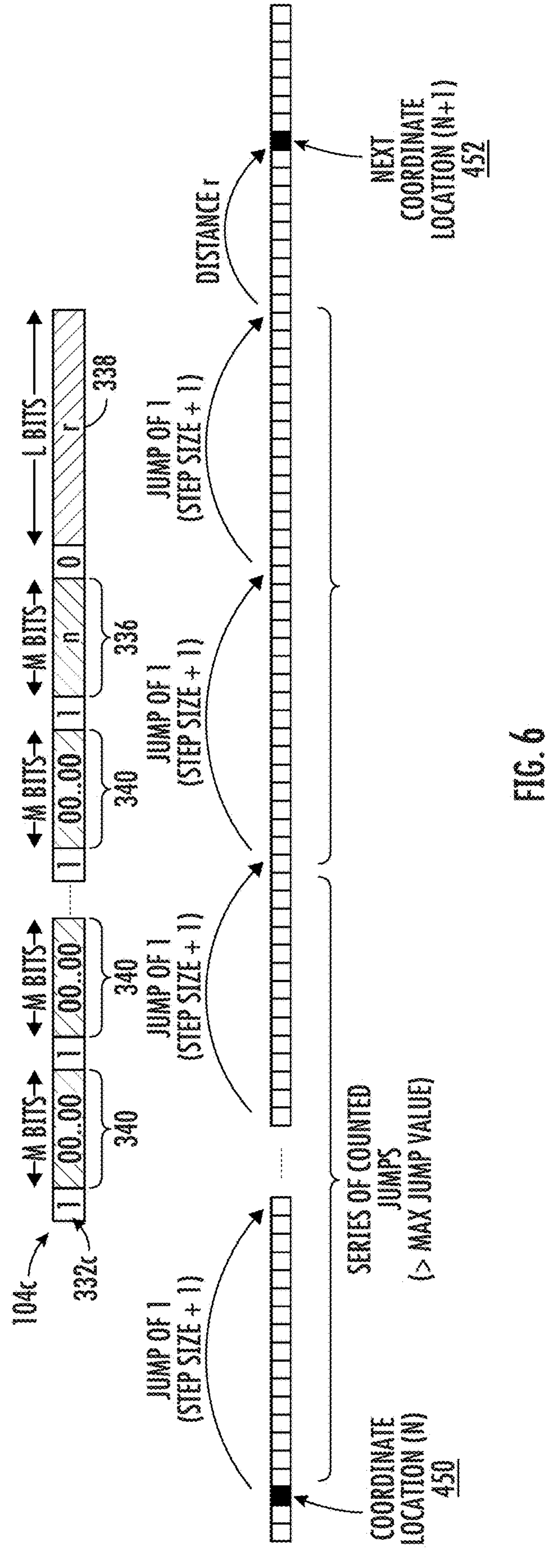
FIG. 6 illustrates a coordinate location encoding indicating a number of jumps greater than the max jump value, in accordance with an example embodiment of the present disclosure.

Referring now to FIG. 6, an example third coordinate location encoding 104*c* is depicted. As depicted in FIG. 6, the example coordinate location encoding 104*c* includes a jump indicator portion 332*c*, a series of max jumps indicators 340 (e.g., jump number portions 336 comprising all zeros), a non-zero jump number portion 336, and a remaining distance indicator portion 338. The coordinate location encoding 104*c* of FIG. 6 encodes the sequential distance of the next coordinate location (N+1) 452 relative to the coordinate location (N) 450.

As shown in the example third coordinate location encoding 104*c* of FIG. 6, the jump indicator portion 332*c* is set to one (indicating a jump is required) and the jump number portion is set to all zeros, indicating a number of jumps greater than the max jump value are necessary to determine the sequential distance. Following the series of max jumps indicators (each indicating a number of jumps equal to the max jump value), a non-zero jump number portion 336 indicating the number of remaining jumps required to determine the sequential distance. Finally, a remaining distance indicator portion 338, indicating the remaining steps in addition to the plurality of jumps, is provided.

The sequential distance in accordance with the third coordinate location encoding 104*c* is thus calculated by multiplying the number of max jumps indicators 340 by the max jump value and adding the jump number portion 336 to get the total number of jumps in the sequential distance. The total number of jumps is then multiplied by the step size. Finally, the remaining distance indicated in the remaining distance indicator portion 338 is added.

Figure 7:
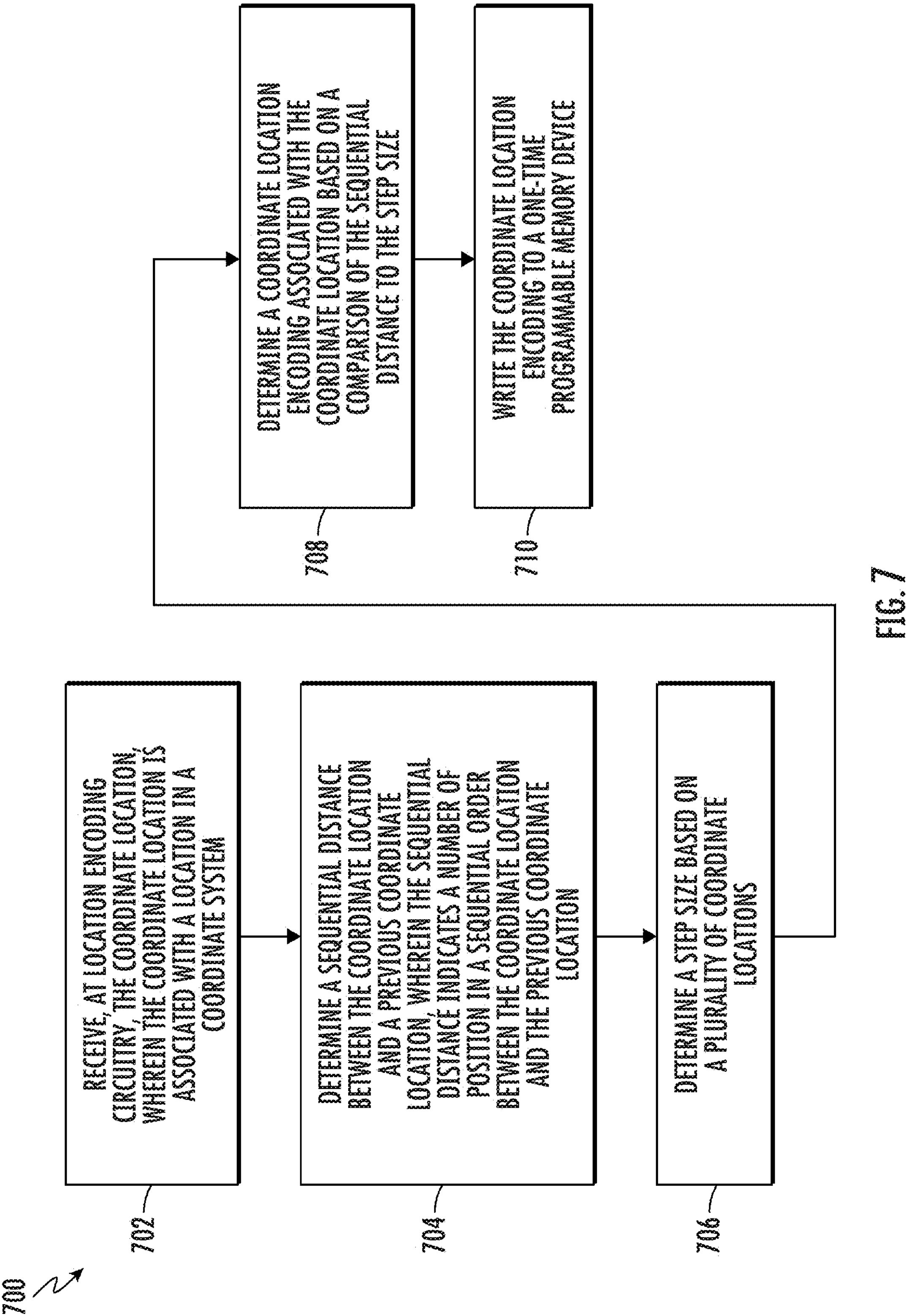
FIG. 7 depicts an example flow chart illustrating a process for determining a coordinate location encoding for a coordinate location in accordance with an example embodiment of the present disclosure.

Referring now to FIG. 7, an example process 700 for determining a coordinate location encoding (e.g., coordinate location encoding 104*a*-104*c*) for a coordinate location (e.g., coordinate location 106) is provided. At block 702, location encoding circuitry (e.g., location encoding circuitry 222) receives the coordinate location, wherein the coordinate location is associated with a location in a coordinate system. In some embodiments, the location encoding circuitry may be configured to access or otherwise receive a plurality of coordinate locations associated with pixel location in a pixel array. For example, during an initialization process, one or more pixel locations in a two-dimensional pixel array may be identified as defective pixels. Each defective pixel may be identified by a coordinate pair (e.g., x, y location) indicating the location of the defective pixel in the two-dimensional array of pixels. The coordinate pair may be transmitted to the location encoding circuitry to receive a coordinate location encoding before being written to the associated memory device (e.g., memory device 102).

At block 704, the location encoding circuitry determines a sequential distance between the coordinate location (e.g., next coordinate location 452) and a previous coordinate location (e.g., coordinate location 450), wherein the sequential distance indicates a number of steps in a sequential order between the coordinate location and the previous coordinate location. To reduce the memory resources required to store a coordinate location in the memory device, the location encoding circuitry may determine a coordinate location encoding based on the sequential distance between the coordinate location and a previous coordinate location in a plurality of coordinate locations to be saved to the associated memory device. The sequential distance is the number of steps between the previous coordinate location and the coordinate location in an instance in which all the coordinate locations of the coordinate system are ordered according to a sequential order. For example, a two-dimensional array of coordinates may be ordered in a row-major order. In such an example, the sequential distance between two coordinates is the number of coordinate locations separating the two coordinates when arranged in a row-major order.

At block 706, the location encoding circuitry determines a step size (e.g., step size) based on a plurality of coordinate locations. The step size indicates the maximum number of steps in a coordinate location encoding that may be represented by the distance indicator portion (e.g., distance indicator portion 334) of the coordinate location encoding. The number of bits comprising the distance indicator portion of the coordinate location encoding may be determined based on the step size. In some embodiments, the step size may be determined based on a statistical distribution of the plurality of coordinate locations to be encoded. For example, in an instance in which defective pixel locations are encoded, the step size may correspond to the average distance between defective pixels on an imaging sensor. In such an example, the step size may be determined by dividing the total number of pixel locations by the total number of defective pixels. The step size is generally rounded to the nearest power of two minus one, in order to be more easily represented by the bits of the distance indicator portion.

At block 708, the location encoding circuitry determines a coordinate location encoding associated with the coordinate location based on a comparison of the sequential distance to the step size. The location encoding circuitry may provide a coordinate location encoding in accordance with a first encoding case in an instance in which a sequential distance between two coordinate locations is less than or equal to the step size. In the first encoding case, a jump indicator portion (e.g., jump indicator portion 332) indicates that the distance between the coordinate location and the previous coordinate location is less than the step size. In the first encoding case, the jump indicator portion is followed by a distance indicator portion (e.g., distance indicator portion 334) directly indicating the sequential distance.

One or more different location encodings may be utilized in an instance in which a sequential distance between two coordinate locations is greater than the step size. In an instance in which the sequential distance between two coordinate locations is greater than the step size, one or more jumps (e.g., change in position equal to the step size plus one) are required to determine the sequential distance.

In a second encoding case, the sequential distance between two coordinates may be indicated by the jump indicator portion and a jump number portion (e.g., jump number portion 336). For example, in one specific embodiment, the jump indicator portion may be set to one (indicting one or more jumps are required) and the jump number portion may be set to any non-zero number. The jump number portion is followed by a remaining distance indicator portion (e.g., remaining distance indicator portion 338). In such a second encoding case, the sequential distance between two successive coordinate locations is determined by multiplying the number of jumps indicated in the jump indicator portion by the step size and adding the remaining distance indicated in the remaining distance indicator portion.

A third coordinate location encoding may be utilized in an instance in which the sequential distance between two successive coordinate locations exceeds the number of jumps representable by the jump number portion (e.g., max jump value) plus the remaining distance representable by the remaining distance indicator portion. The third coordinate location encoding may be indicated by the jump indicator portion followed by a max jumps indicator (e.g., max jumps indicator 340). In one specific embodiment, the jump indicator portion may be set to one (indicting one or more jumps are required) and the jump number portion may be set to all zeros, indicating the max number of jumps are necessary to determine the sequential distance. A plurality of max jumps indicators may be repeated in the third coordinate location encoding as necessary. The third coordinate location encoding concludes with a non-zero jump number portion, followed by a remaining distance indicator portion. In such a third coordinate location encoding, the sequential distance between two successive coordinate locations is determined by multiplying the number of max jumps indicators by the max jump value and adding the jump number portion to get the total number of jumps in the sequential distance. The total number of jumps is then multiplied by the step size. Finally, the remaining distance indicated in the remaining distance indicator portion is added to the sequential distance.

At block 710, the location encoding circuitry writes the coordinate location encoding to a memory device (e.g., memory device 102). The location encoding circuitry may utilize any memory communication protocol to transmit the coordinate location encoding to a connected memory device. In some embodiments, in which the coordinate locations correspond to defective pixel locations, the memory device may be on or otherwise accessible to the imaging sensor. Thus, the defective pixels may be accessed by the imaging sensor or host processing system during operation.

Although not described in relation to FIG. 7, a coordinate location translation apparatus may also include location decoding circuitry (e.g., location decoding circuitry 224) to determine a coordinate location based on a coordinate location encoding. The location decoding circuitry may comprise receiving, the coordinate location encoding; determining the sequential distance between the coordinate location and the previous coordinate location based on the coordinate location encoding; and determining the coordinate location in the coordinate system based on the sequential distance and the previous coordinate location. For example, the location decoding circuitry may determine the type of coordinate location encoding based on the jump indicator portion and the jump number portion of the coordinate location encoding.

In a first encoding case of a coordinate location, the sequential distance is determined by reading the distance indicator portion. The associated coordinate location is derived based on the previous coordinate location and the pre-determined sequential order associated with the coordinate system.

In the second and third encoding cases of the coordinate location encodings the sequential distance is determined based on the determined number of jumps and the remaining distance indicator portion. The associated coordinate location is derived based on the previous coordinate location and the pre-determined sequential order associated with the coordinate system.

In some embodiments, the location decoding circuitry may be implemented utilizing simple control logic, such as accumulators, adders, and shifters controlled with finite state machines and/or counters.

Figure 8:
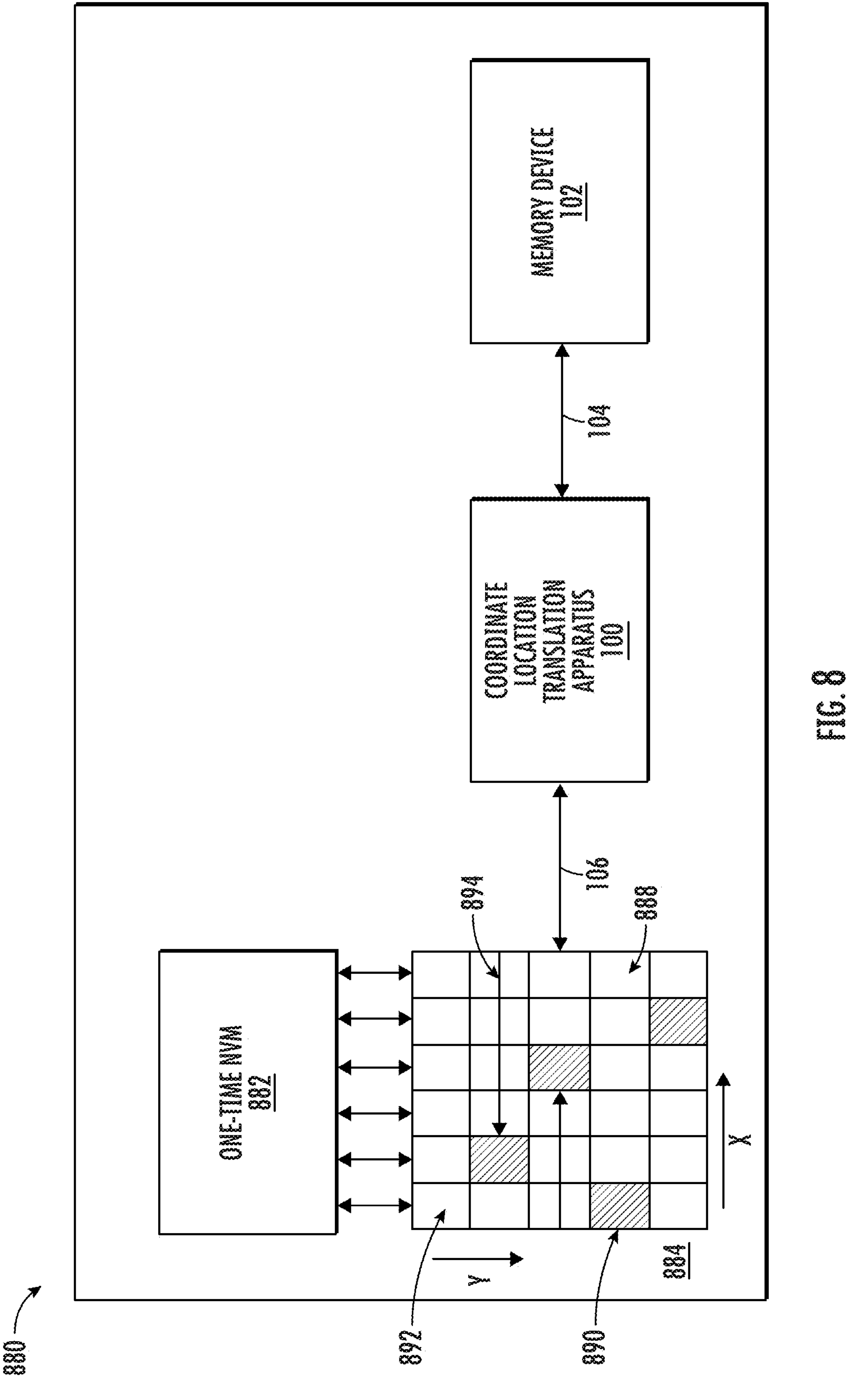
FIG. 8 depicts an example imaging sensor comprising a coordinate location translation apparatus in accordance with an example embodiment of the present disclosure.

Referring now to FIG. 8, an example imaging sensor 880 is provided. As depicted in FIG. 8, the example imaging sensor includes a two-dimensional array of pixels 884 comprising a plurality of pixels 888, including a second plurality of defective pixels 890. The two-dimensional array of pixels 884 is associated with a contiguous memory block 886. The coordinate location translation apparatus 100 is configured to receive coordinate locations associated with defective pixels 890 and generate coordinate location encodings 108 associated with the coordinate locations 106. The coordinate location encodings 108 are written to a one-time non-volatile memory 882 on the imaging sensor 880.

As depicted in FIG. 8, the two-dimensional array of pixels 884 is associated with an x, y coordinate system, wherein the x location indicates a column in the two-dimensional array of pixels 884, and the y-location indicators a row in the two-dimensional array of pixels 884. As further indicated in FIG. 8, the two-dimensional array of pixels 884 is associated with an origin coordinate location 892. When determining a coordinate location encoding, the first coordinate location is encoded based on a sequential distance from the origin coordinate location 892. A sequential distance 894 between two successive coordinate locations is also illustrated. As depicted in FIG. 8, the sequential distance 894 indicates a sequential distance between two successive coordinate locations in an instance in which the coordinate locations of the two-dimensional array of pixels 884 is ordered in a row-major sequential ordering.

Figure 9:
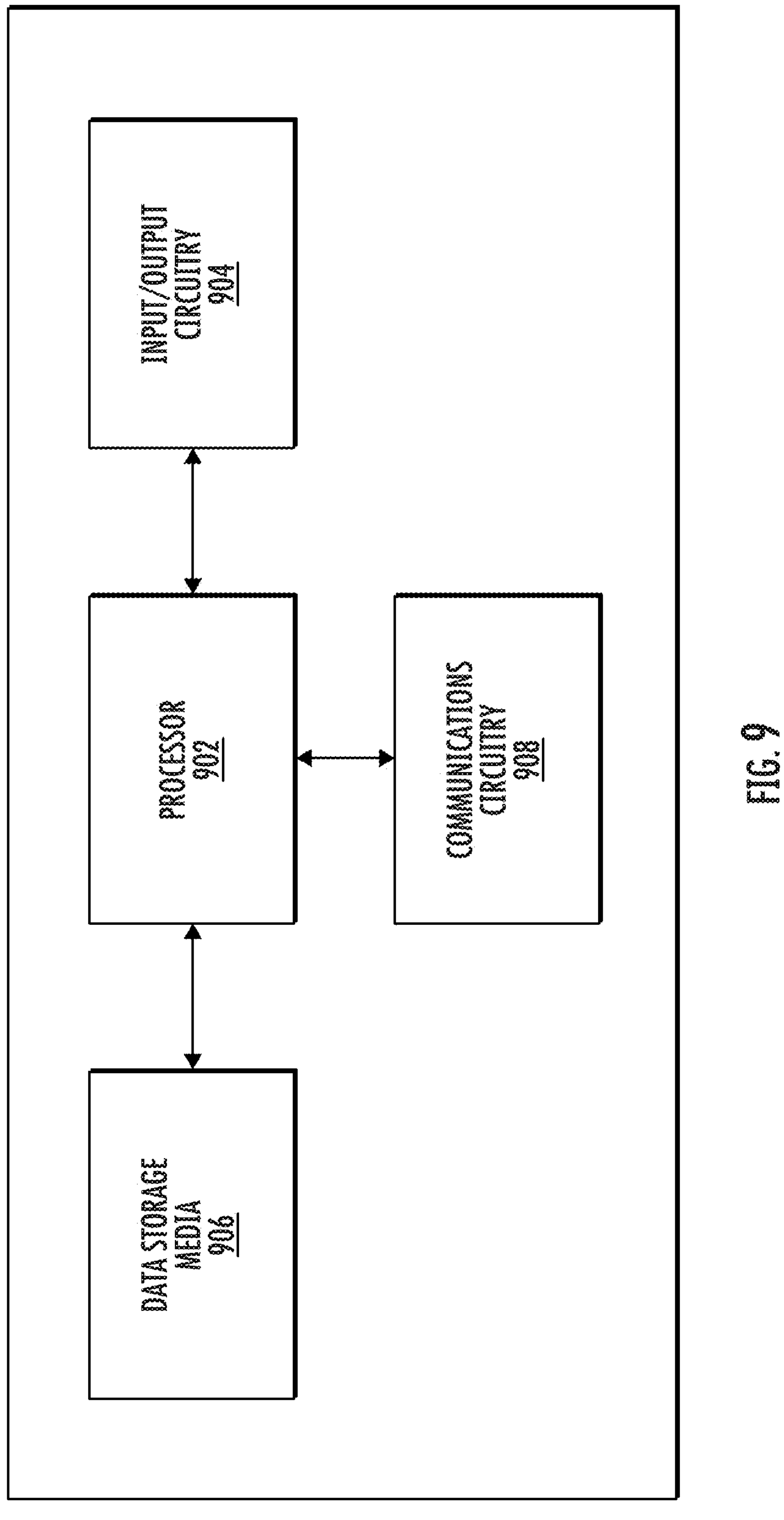
FIG. 9 depicts an example block diagram of computing components of a coordinate location translation apparatus in accordance with an example embodiment of the present disclosure.

Referring now to FIG. 9, FIG. 9 illustrates an example coordinate location translation apparatus 100 in accordance with at least some example embodiments of the present disclosure. The coordinate location translation apparatus 100 includes processor 902, input/output circuitry 904, data storage media 906, and communications circuitry 908. In some embodiments, the coordinate location translation apparatus 100 is configured, using one or more of the sets of circuitry 902, 904, 906, and/or 908, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the coordinate location translation apparatus 100 provide or supplement the functionality of other particular sets of circuitry. For example, the processor 902 in some embodiments provides processing functionality to any of the sets of circuitry, the data storage media 906 provides storage functionality to any of the sets of circuitry, the communications circuitry 908 provides network interface functionality to any of the sets of circuitry, and/or the like.

In some embodiments, the processor 902 (and/or coprocessor or any other processing circuitry assisting or otherwise associated with the processor) is/are in communication with the data storage media 906 via a bus for passing information among components of the coordinate location translation apparatus 100. In some embodiments, for example, the data storage media 906 is non-transitory and may include, for example, one or more volatile and/or non-volatile memories. In other words, for example, the data storage media 906 in some embodiments includes or embodies an electronic storage device (e.g., a computer readable storage medium). In some embodiments, the data storage media 906 is configured to store information, data, content, applications, instructions, or the like, for enabling the coordinate location translation apparatus 100 to carry out various functions in accordance with example embodiments of the present disclosure.

The processor 902 may be embodied in a number of different ways. For example, in some example embodiments, the processor 902 includes one or more processing devices configured to perform independently. Additionally, or alternatively, in some embodiments, the processor 902 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the coordinate location translation apparatus 100, and/or one or more remote or "cloud" processor(s) external to the coordinate location translation apparatus 100.

In an example embodiment, the processor 902 is configured to execute instructions stored in the data storage media 906 or otherwise accessible to the processor. Alternatively, or additionally, the processor 902 in some embodiments is configured to execute hard-coded functionality. As such, whether configured by hardware or software methods, or by a combination thereof, the processor 902 represents an entity (e.g., physically embodied in circuitry) capable of performing operations according to an embodiment of the present disclosure while configured accordingly. Alternatively, or additionally, as another example in some example embodiments, when the processor 902 is embodied as an executor of software instructions, the instructions specifically configure the processor 902 to perform the algorithms embodied in the specific operations described herein when such instructions are executed.

In some embodiments, the coordinate location translation apparatus 100 includes input/output circuitry 904 that provides output to the user and, in some embodiments, to receive an indication of a user input. In some embodiments, the input/output circuitry 904 is in communication with the processor 902 to provide such functionality. The input/output circuitry 904 may comprise one or more user interface(s) (e.g., user interface) and in some embodiments includes a display that comprises the interface(s) rendered as a web user interface, an application user interface, a user device, a backend system, or the like. The processor 902 and/or input/output circuitry 904 comprising the processor may be configured to control one or more functions of one or more user interface elements through computer program instructions (e.g., software and/or firmware) stored on a memory accessible to the processor (e.g., data storage media 906, and/or the like). In some embodiments, the input/output circuitry 904 includes or utilizes a user-facing application to provide input/output functionality to a client device and/or other display associated with a user.

In some embodiments, the coordinate location translation apparatus 100 includes communications circuitry 908. The communications circuitry 908 includes any means such as a device or circuitry embodied in either hardware or a combination of hardware and software that is configured to receive and/or transmit data from/to a network and/or any other device, circuitry, or module in communication with the coordinate location translation apparatus 100. In this regard, the communications circuitry 908 includes, for example in some embodiments, a network interface for enabling communications with a wired or wireless communications network. Additionally, or alternatively in some embodiments, the communications circuitry 908 includes one or more network interface card(s), antenna(s), bus(es), switch(es), router(s), modem(s), and supporting hardware, firmware, and/or software, or any other device suitable for enabling communications via one or more communications network (s). Additionally, or alternatively, the communications circuitry 908 includes circuitry for interacting with the antenna (s) and/or other hardware or software to cause transmission of signals via the antenna(s) or to handle receipt of signals received via the antenna(s). In some embodiments, the communications circuitry 908 enables transmission to and/or receipt of data from a client device in communication with the coordinate location translation apparatus 100.

Additionally, or alternatively, in some embodiments, one or more of the sets of circuitry 902-914 are combinable. Additionally, or alternatively, in some embodiments, one or more of the sets of circuitry perform some or all of the functionality described associated with another component. For example, in some embodiments, one or more sets of circuitry 902-908 are combined into a single module embodied in hardware, software, firmware, and/or a combination thereof. Similarly, in some embodiments, one or more of the sets of circuitry is/are combined such that the processor 902 performs one or more of the operations described above with respect to each of these circuitry individually.

While this detailed description has set forth some embodiments of the present invention, the appended claims cover other embodiments of the present invention which differ from the described embodiments according to various modifications and improvements. For example, one skilled in the art may recognize that such principles may be applied to any electronic device configured to store a subset of coordinate locations associated with a coordinate system. For example, pixel locations associated with an imaging sensor, antenna locations associated with an antenna array, pixel locations on a digital display screen or touch screen, and so on.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:

location encoding circuitry configured to:

receive a coordinate location associated with a location in a coordinate system of an imaging sensor;

determine a sequential distance between the coordinate location and a previous coordinate location, wherein the sequential distance indicates a number of positions in a sequential order between the coordinate location and the previous coordinate location;

determine a step size based on a plurality of coordinate locations;

determine a coordinate location encoding associated with the coordinate location based on a comparison of the sequential distance to the step size; and write the coordinate location encoding to a one-time programmable memory device associated with the imaging sensor.

2. The apparatus of claim 1, further comprising:

location decoding circuitry configured to:

receive the coordinate location encoding;

determine the sequential distance between the coordinate location and the previous coordinate location based on the coordinate location encoding; and determine the coordinate location in the coordinate system based on the sequential distance and the previous coordinate location.

3. The apparatus of claim 1, wherein each coordinate location in the coordinate system corresponds to a pixel on the imaging sensor.

4. The apparatus of claim 3, wherein the coordinate location corresponds to a defective pixel.

5. The apparatus of claim 3, wherein the coordinate system corresponds to a two-dimensional array of pixels.

6. The apparatus of claim 5, wherein the sequential order is a row-major order.

7. The apparatus of claim 1, wherein the apparatus is located on the imaging sensor.

8. The apparatus of claim 1, wherein the location encoding circuitry is further configured to:

receive the plurality of coordinate locations; and determine the step size based on a statistical representation of an average number of positions between the plurality of coordinate locations.

9. The apparatus of claim 1, wherein the coordinate location encoding indicates the sequential distance is greater than the step size.

10. The apparatus of claim 1, wherein the coordinate location is associated with a memory location in a contiguous memory block.

11. The apparatus of claim 10, wherein each memory location in the contiguous memory block corresponds to the location of the coordinate location in the coordinate system.

12. The apparatus of claim 11, wherein consecutive memory locations in the contiguous memory block correspond with the sequential order.

13. A computer-implemented method for encoding a coordinate location, the computer-implemented method comprising:

receiving, at location encoding circuitry, the coordinate location, wherein the coordinate location is associated with a location in a coordinate system of an imaging sensor;

determining a sequential distance between the coordinate location and a previous coordinate location, wherein the sequential distance indicates a number of positions in a sequential order between the coordinate location and the previous coordinate location;

determining a step size based on a plurality of coordinate locations;

determining a coordinate location encoding associated with the coordinate location based on a comparison of the sequential distance to the step size; and writing the coordinate location encoding to a one-time programmable memory device associated with the imaging sensor.

14. The computer-implemented method of claim 13, further comprising:

receiving, at location decoding circuitry, the coordinate location encoding;

determining the sequential distance between the coordinate location and the previous coordinate location based on the coordinate location encoding; and determining the coordinate location in the coordinate system based on the sequential distance and the previous coordinate location.

15. The computer-implemented method of claim 13, wherein each memory location in the coordinate system corresponds to a defective pixel on the imaging sensor.

16. The computer-implemented method of claim 13, wherein the coordinate location encoding indicates the sequential distance is greater than the step size.

17. An imaging sensor, comprising:

a two-dimensional array of pixels;

a one-time programmable memory device; and an apparatus comprising:

location encoding circuitry configured to:

receive a coordinate location associated with a location of a pixel in a coordinate system corresponding to the two-dimensional array of pixels;

determine a sequential distance between the coordinate location and a previous coordinate location, wherein the sequential distance indicates a number of positions in a sequential order between the coordinate location and the previous coordinate location;

determine a step size based on a plurality of coordinate locations;

determine a coordinate location encoding associated with the coordinate location based on a comparison of the sequential distance to the step size; and write the coordinate location encoding to the one-time programmable memory device.

* * * * *